United States Patent
Hollinshed

(10) Patent No.: US 11,555,608 B1
(45) Date of Patent: Jan. 17, 2023

(54) ILLUMINATED TWO-PIECE EXHIBIT

(71) Applicant: Leron Hollinshed, Olathe, KS (US)

(72) Inventor: Leron Hollinshed, Olathe, KS (US)

( * ) Notice: Subject to any disclaimer, the term of this patent is extended or adjusted under 35 U.S.C. 154(b) by 0 days.

(21) Appl. No.: 17/533,311

(22) Filed: Nov. 23, 2021

(51) Int. Cl.
*F21V 33/00* (2006.01)
*G02B 5/02* (2006.01)

(52) U.S. Cl.
CPC ........ *F21V 33/0004* (2013.01); *G02B 5/0294* (2013.01)

(58) Field of Classification Search
CPC .. B65D 43/16–18; B65D 51/02; A45D 33/32; A44C 15/0015
See application file for complete search history.

(56) References Cited

U.S. PATENT DOCUMENTS

| | | | |
|---|---|---|---|
| 2,556,779 A | 6/1951 | Ross | |
| 2,816,378 A | 12/1957 | Levinson | |
| 4,101,955 A * | 7/1978 | DuNah | A44C 15/0015 63/18 |
| 5,056,660 A * | 10/1991 | Huang | G09F 25/00 84/2 |
| 5,810,162 A * | 9/1998 | Au | A45C 11/16 16/334 |
| 6,059,423 A | 5/2000 | Knopick | |
| 6,174,072 B1 | 1/2001 | Root, Jr. | |
| D440,486 S * | 4/2001 | Szmergalski | 229/116.1 |
| 6,213,616 B1 | 4/2001 | Chien | |
| 1,454,967 A1 | 3/2002 | Brown et al. | |
| 6,886,959 B2 | 5/2005 | Record | |
| 7,086,751 B2 | 8/2006 | Clark | |
| 8,579,459 B2 | 11/2013 | Ma et al. | |
| 2004/0212987 A1 | 10/2004 | Lu | |
| 2005/0246928 A1 | 10/2005 | Lee | |
| 2006/0117794 A1 * | 6/2006 | Solomon | A44C 15/0015 63/1.13 |
| 2007/0115653 A1 * | 5/2007 | Cea | A47F 3/001 362/104 |
| 2011/0110105 A1 | 5/2011 | Kenney | |
| 2018/0148216 A1 | 5/2018 | Stephens et al. | |

FOREIGN PATENT DOCUMENTS

| | | |
|---|---|---|
| CN | 2010124400 | 3/2020 |
| EP | 0016589 | 1/1980 |
| EP | 2843294 | 6/2017 |
| KR | 200331003 | 10/2003 |
| TW | 200525071 | 8/2005 |
| WO | 2005110144 | 11/2005 |

* cited by examiner

*Primary Examiner* — Leah Simone Macchiarolo
(74) *Attorney, Agent, or Firm* — McDowell, Rice, Smith & Buchanan, P.C.; Arthur Shaffer

(57) ABSTRACT

The present invention an illuminated two-piece exhibit includes a first arcuate arm, a second arcuate arm joined to the first arcuate end at a proximate end, an intermediary arc extends between the first arcuate arm and the second arcuate arm at a distal end, a diffusor configured for receiving a light source, a centrally located receptacle extending between the first arcuate arm and the second arcuate arm, a window extending from the centrally located receptacle through the first arcuate arm and the second arcuate arm, the diffusor extending from said centrally located receptacle and at least partially through the window wherein the diffusor is configured for illumination by the light source.

8 Claims, 6 Drawing Sheets

ILLUMINATED TWO-PIECE EXHIBIT

FIELD OF THE INVENTION

The present disclosure generally relates to an illuminated display and more particularly, to an illuminated two-piece exhibit which includes a light caddy which is configured for receipt of a translucent complementary shaped diffusor which is at least partially illuminated from a received illumination source.

BACKGROUND OF THE INVENTION

Approximately sixty million people get married in the U.S. each year. At a typical marriage ceremony, there are various rituals designed to celebrate the joining of the previously unmarried couple. Wedding unity ceremonies have been in use as part of weddings for many years. People from all over the world incorporate unity ceremonies into their weddings because these ceremonies have symbolic and meaningful attributes that enhance the wedding experience and make it unique.

Various ceremonies use an object to provide a visual image of unity including a lantern, a candle, a lasso, a rope or cord, sand, glass, beer, wine, or water. While many of the visual representations have a decorative, visual appeal, many of them are short-lived, can be chaotic, messy, unreliable and, in the case of fire, dangerous.

Some of these rituals and celebrations use candles to visually symbolize the joining of the parties mentally, spiritually and physically and to affirm the commitment of the parties. In the unity candle ceremony, for instance, the bride and groom each receive a lit candle from their parents and use them to simultaneously light their unity candle. An officiant reads a corresponding ceremony of the couple's choice during this time, and the lighting of the unity candle is viewed as symbolic of the union of marriage. There are many variations of this example, and the end result is an additional ceremony for the wedding and the candle itself becomes a keepsake for the couple that is considered symbolic of their wedding day.

Another example of an existing wedding unity ceremony is the use of sand for a unity ceremony. In a sand ceremony, the bride and groom are instructed to pour sand into a vase either one at a time or simultaneously. The sands are considered to be symbolic of the couple and their union of marriage, just as the lighting of the candle in the aforementioned example.

There has been a long felt need for an alternative to the unity candle ceremony for a variety of reasons. One of these reasons is that many churches and other religious sites restrict the use of candles in weddings because of the fear of fire damage to the property. Another reason is the fact that many weddings are held outside and on beaches, and the use of candles is difficult, if not impossible, because of the wind or weather, and the difficulty in predicting them.

There has also been a long felt need for improvements to the traditional sand unity Ceremony. The primary reason for this is that an appropriate keepsake or heirloom vessel into which the sand is filled has been lacking. In addition, the sand just rests in a vase, and the vase does not provide for the sand to readily flow or blend together. Additionally, most vases used lack the utility of an attractive, easy to use mechanism for the opening and sealing of the vase. The sands from the ceremony are therefore not ideally stored for the purposes of display and for the purposes of passing them down through generations of the family as a keepsake or heirloom.

There has also been a long felt need for an alternative to traditional wedding unity ceremonies, such as the unity candle ceremony and the unity sand ceremony. The feeling for this need arises from the desire to make the wedding a unique experience, to display a unique symbol of the union of marriage and the joining of the families and in doing these things create an appropriate keepsake or family heirloom. Many couples that desire to have a night-time wedding have had a long felt need to incorporate an appropriate visual experience to their wedding, which can be replicated at a later time. In addition, couples have had the long felt need for a wedding ceremony that can result in a visual representation of the unification of the parties which includes illumination and can be preformed at a later time for the purposes of their subsequent honeymoon, anniversaries, vacations, gifts, special events, and/or renewing of vows.

Based in part on the foregoing challenges, there exists a need for an illuminated two-piece display which provides a visual representation of unification associated with a marriage ceremony.

SUMMARY OF THE INVENTION

The need for the present invention is met, to a great extent, by the present invention wherein in one aspect an illuminated two-piece exhibit is provided that in some embodiments will present a visual representation of the unification of the parties in a marriage ceremony. The illuminated two-piece exhibit generally provides an illuminated visual object with an illumination circuit which extends at least partially through an outer covering, the illuminated visual object with illumination source being presented through the two-piece display.

In one embodiment, the illuminated two-piece exhibit comprises a first arcuate arm, a second arcuate arm joined to said first arcuate end at a proximate end, an intermediary arc extending between said first arcuate arm and said second arcuate arm at a distal end, a diffusor configured for receiving a light source, a centrally located receptacle extending between said first arcuate arm and said second arcuate arm, a window extending from said centrally located through said first arcuate arm and said second arcuate arm, and said diffusor extending from said centrally located receptacle and at least partially through said window wherein said diffusor is configured for illumination by said light source.

Generally, the illuminated two-piece exhibit includes a shaped visual object which extends from a supporting structure through a presentation structure. Generally, the illumination source illuminates the shaped visual object for illumination at the desired time during a marriage ceremony, for example. Generally, the illumination source is powered by an illumination circuit which as depicted includes a first contact switch in electrical communication with a second contact switch. When both are operationally engaged, they provide power from a power source to the illumination device, such as, but not limited to a light emitting diode for illuminated display of the visual object.

Certain embodiments of the invention are outlined above in order that the detailed description thereof may be better understood, and in order that the present contributes to the art may be better appreciated. There are, of course, additional embodiments of the invention that will be described below and which will form the subject matter of any claims appended hereto.

In this respect, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein as well as the abstract are for the purposes of description and should not be regarded as limiting.

As such, those skilled in the relevant art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention. Though some features of the invention may be claimed in dependency, each feature has merit when used independently.

Various objects and advantages of the present invention will become apparent from the following description taken in conjunction with the accompanying drawings wherein are set forth, by way of illustration and example, certain embodiments of this invention. The drawings submitted herewith constitute a part of this specification, include exemplary embodiments of the present invention, and illustrate various objects and features thereof.

BRIEF DESCRIPTION OF THE DRAWINGS

Further features of the present invention will become apparent to those skilled in the art to which the present invention relates from reading the following description with reference to the accompanying drawings, in which a better understanding of the present invention is depicted, in which.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Accordingly, the above problems and difficulties are obviated, at least in part, by the present 2-piece illuminated exhibit 10 which provides a light caddy 13 with an outer multi-contoured surface which moves between an open and a closed position for receiving a diffusor 26 which absorbs and directs illumination from the illumination source 30 outward through the light caddy 13.

Figure 1:
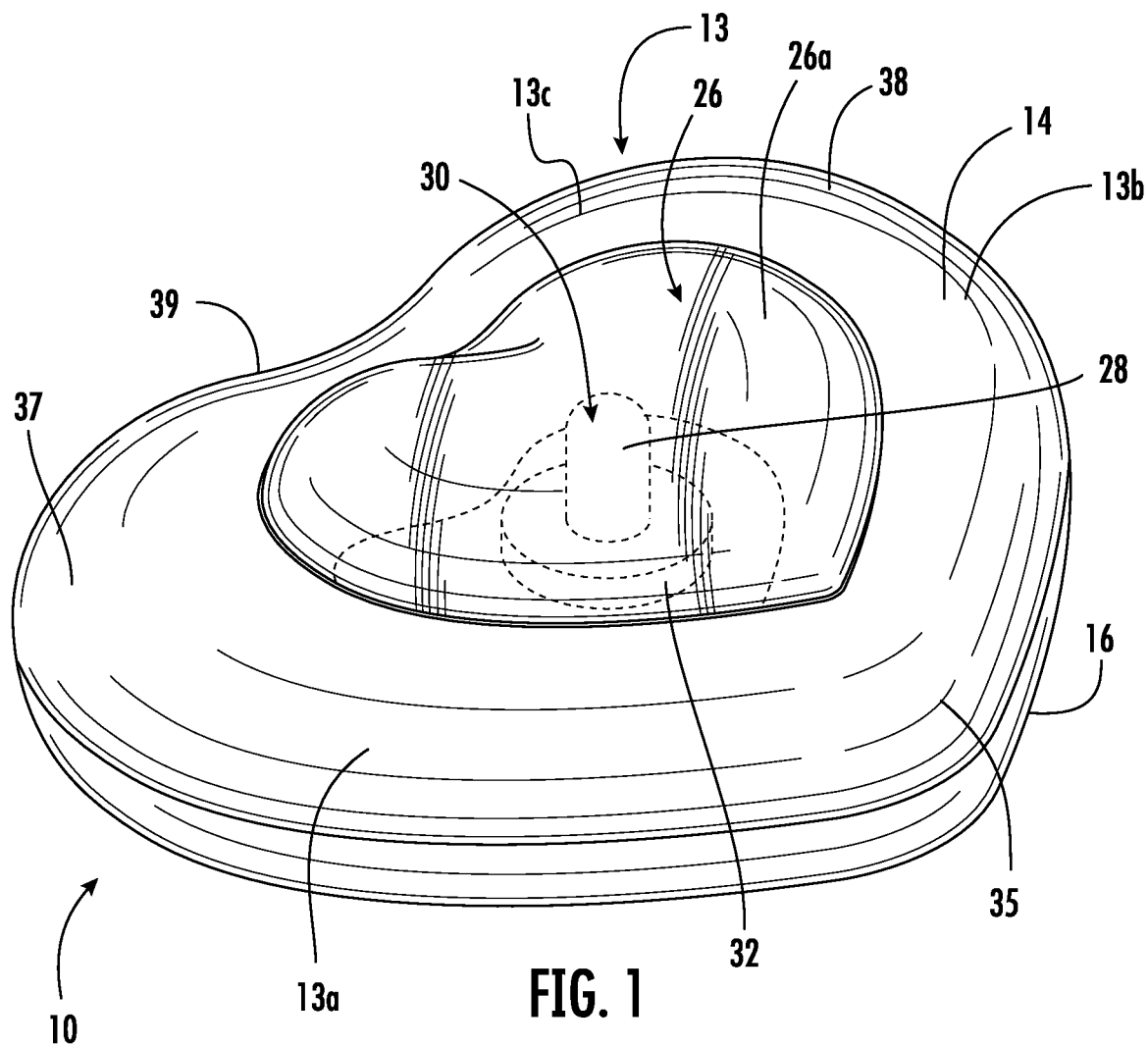
FIG. 1 is a perspective of an exemplary embodiment of the illuminated two-piece exhibit in the closed position.
Figure 2:
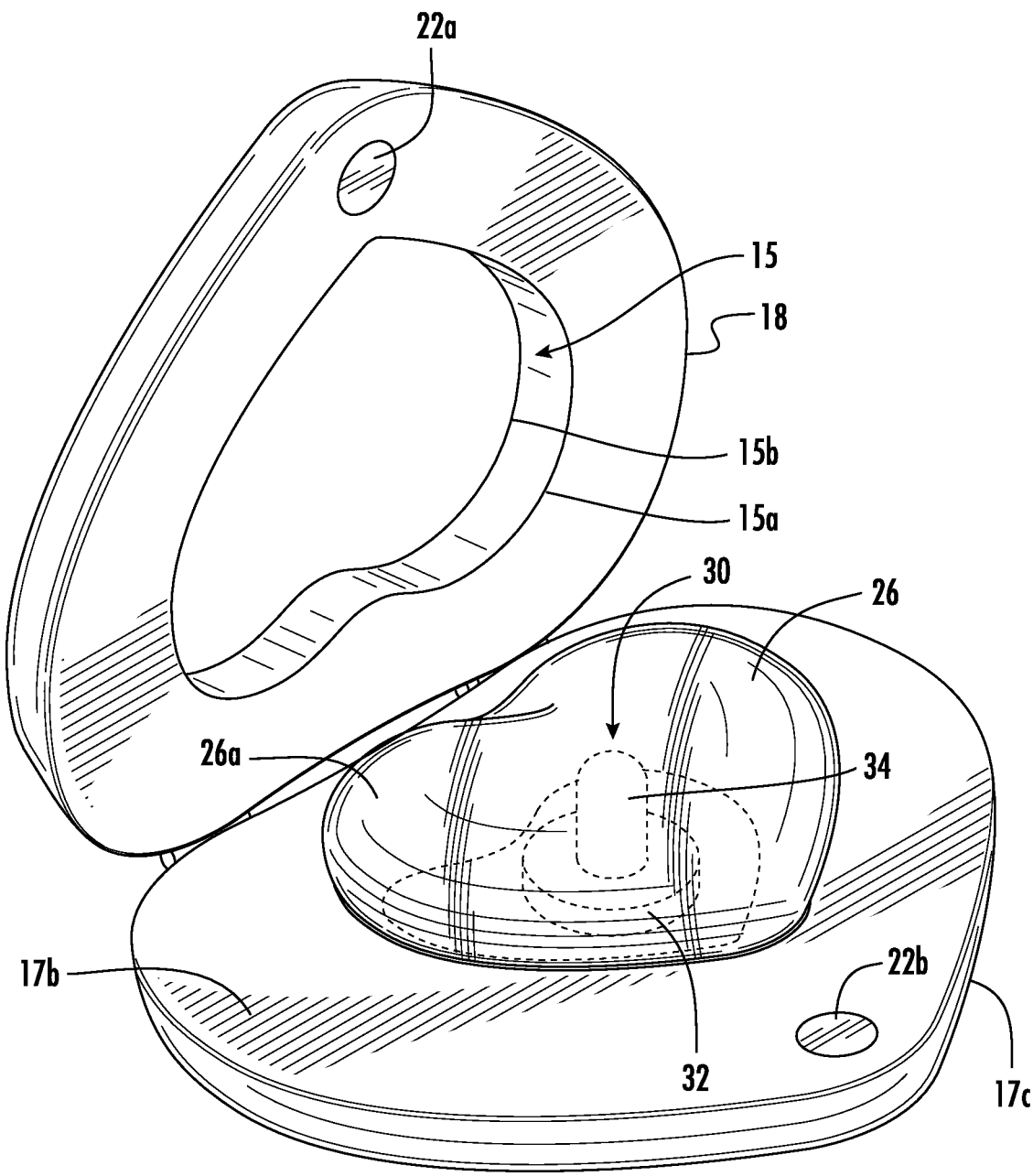
FIG. 2 is a left-side perspective of the exemplary embodiment of the illuminated two-piece exhibit in the open position.

The light caddy 13 is configured with a centrally located receptacle 17 configured for receiving and displaying the diffusor 26 at least partially through the light caddy 13. The embodiment of the light caddy 13 depicted in FIGS. 1-2 is multi-contoured and includes a top portion 16 operably separated from a bottom portion 19 connected with a pair of hinges 12. The hinges 12 allow the top portion 16 and the bottom portion 19 to move for operation of the light caddy 13 between a closed position depicted in FIG. 1 and an open position depicted in FIG. 2.

In one exemplary embodiment, the light caddy 13 includes a first arcuate arm 13a is positioned adjacent to a second arcuate arm 13b at a proximate end and are separated from the second arcuate arm 13b at a distal end by an intermediary arc 13c. The window 15 extends from the centrally located receptacle 17 and between the first and second arcuate arms for partial receipt of the diffusor 26.

Figure 3:
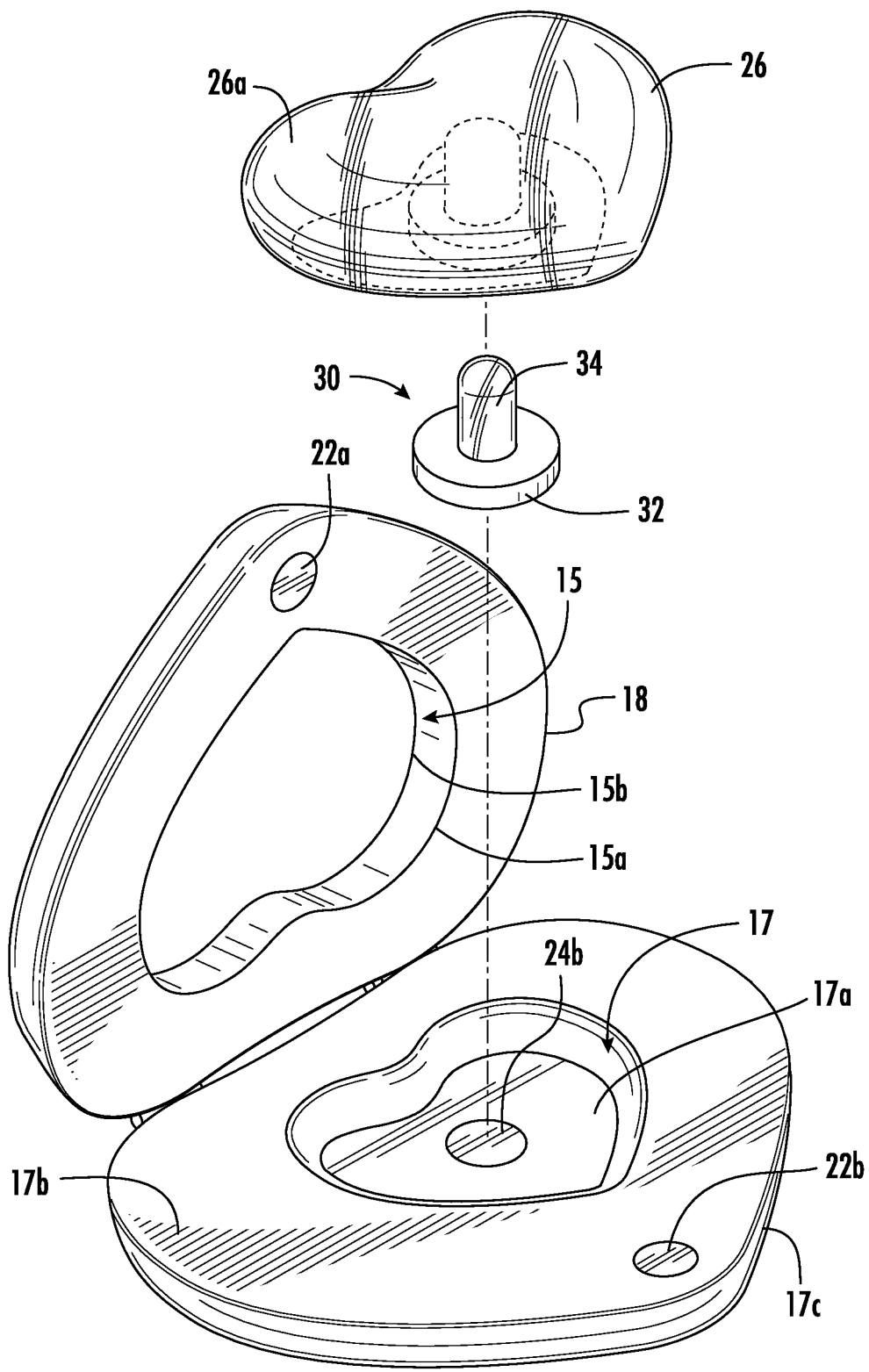
FIG. 3 is a left-side exploded perspective of the exemplary embodiment of the illuminated two-piece exhibit in the open position according to FIG. 2.
Figure 4:
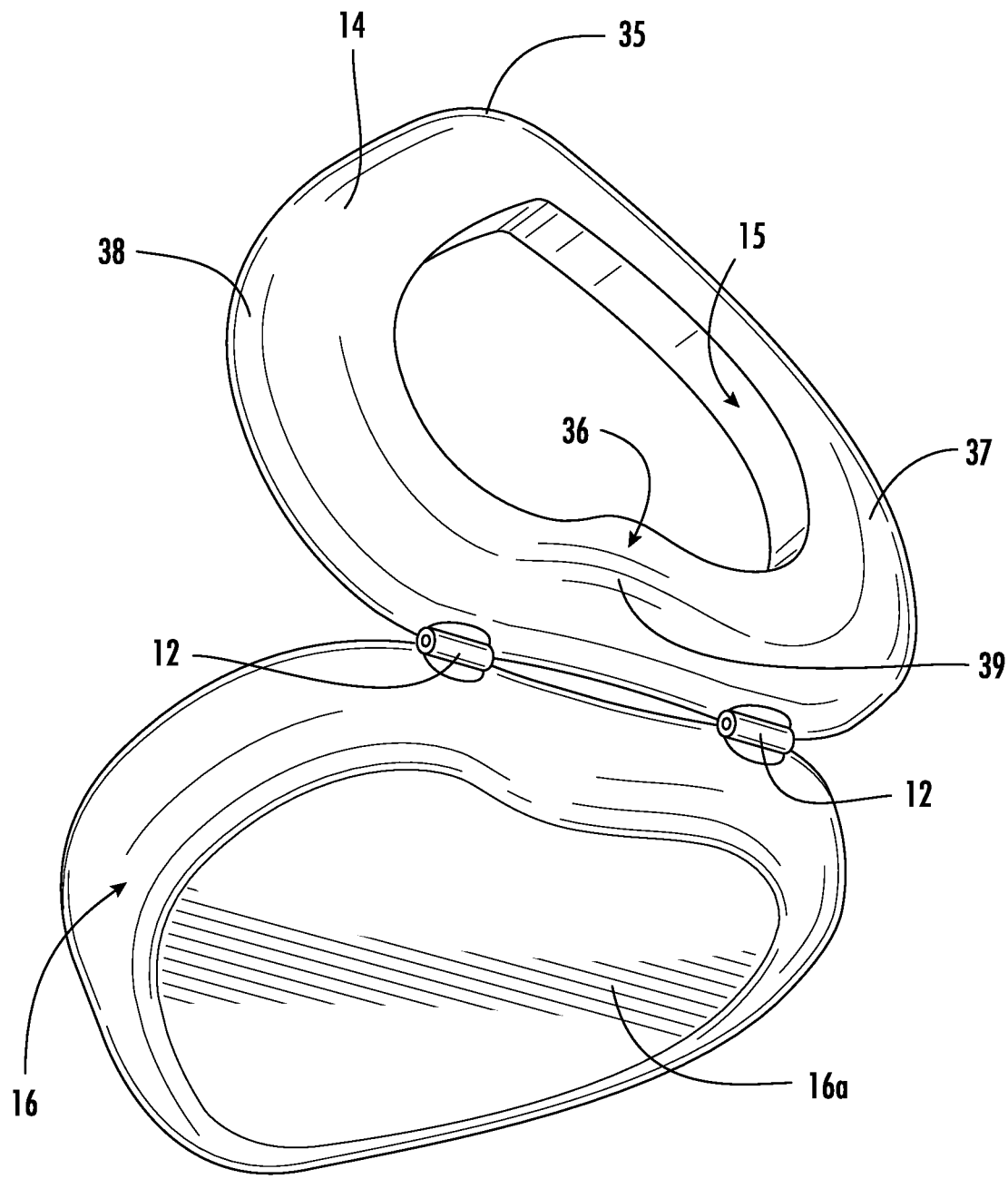
FIG. 4 is a bottom perspective view of the exemplary embodiment of the illuminated two-piece exhibit in the open position according to FIG. 2.
Figure 5:
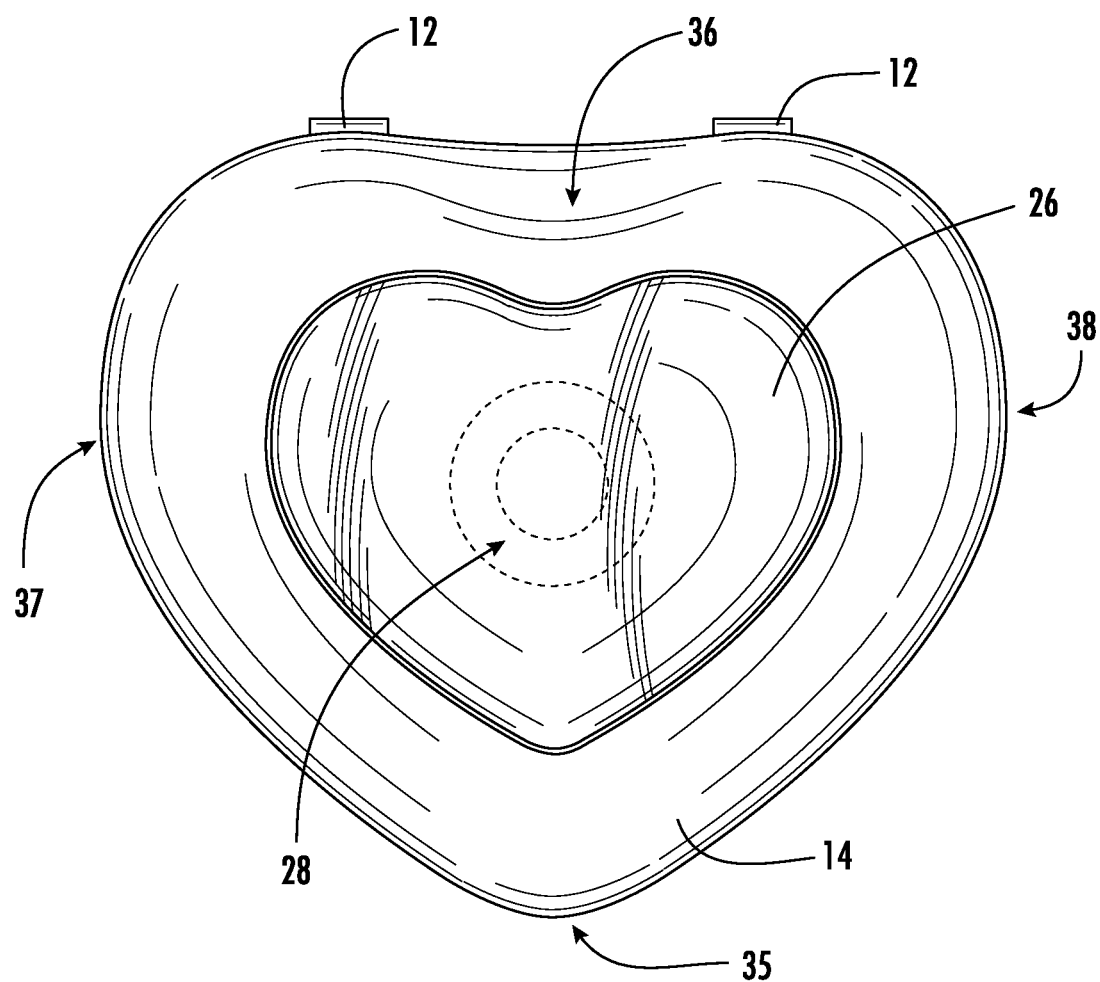
FIG. 5 is a top plan view of the exemplary embodiment of illuminated two-piece exhibit in the open position according to FIG. 4.
Figure 6:
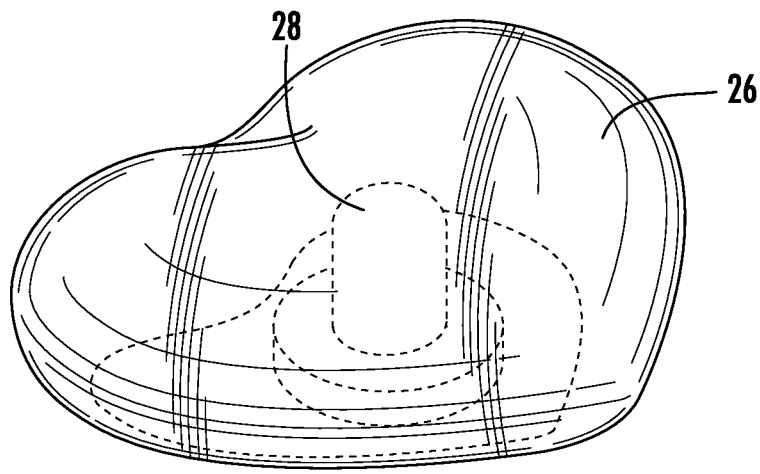
FIG. 6 is a left side perspective of an exemplary diffusor in receipt of the exemplary illumination source FIG. 3.

The top 14 depicted in FIGS. 1-3 is generally curved and extends radially from the window 15 towards an outer edge 18. The top 14 includes a first countered segment 37 joined to a second contoured segment 38 at a tapered tip 35, with an intermediary segment 39 spanning the first contoured segment 37 and the second contoured segment 38 at a concave end 36.

As further illustrated in FIG. 2, the bottom portion 19 includes the centrally located receptacle 17 presented by a sidewall extending vertically from an inferior plane 17a to a superior plane 17b and radially from an outer surface 17c to an inner sidewall 17d. The inner sidewall 17d presents the centrally located receptacle 17 and extends between the inferior plane 17a and the superior plane 17b. The outer surface 17c and the outer edge 18 are generally complementary and as depicted in FIGS. 1-6 are generally cardioid or epicycloid characterized by a point on the circumference of a pair of equal radius wheels, one rotating along the circumference of the other. Alternatively, the outer surface 17c and the outer edge 18 may be alternatively shaped while maintaining relatively complementary diameters. These alternative shapes may include a circular edge or a polygonal shaped edge with matched top and the bottom structures. The centrally located receptacle 17 is generally shaped to match the shape and contour of an outer convex surface 26a associated with the diffusor 26. The outer convex surface 26a is generally curved and receives the illumination source and redirects the received illumination is dispersed outwardly from the illumination source 30 for at least partial illumination of the diffusor 26.

The window 15 is generally shaped to match the shape and contour of the diffusor 26 with a curved sidewall extending vertically between an inferior perimeter 15a and a superior perimeter 15b. The superior perimeter 15b is generally smaller than the inferior perimeter 15a. The inferior perimeter 15a has a cross section larger than the outer dimension of the diffusor 26, and the superior perimeter 15b has a cross section smaller than the outer dimension of the diffusor 26 which reduces movement of the diffusor 26 when the light caddy 13 is in a closed position. In operation the diffusor 26 extends at least partially through the window 15.

The window 15 and the centrally located receptacle 17 jointly receive the diffuser 26 within the light caddy 13 when in a closed position. Additionally, when the illumination receptable 13 is closed, the inner sidewall 17d and the sidewall of the window 15 form a uniform continuous sidewall contoured to the shape of the diffusor 26.

The illumination circuit 20 is configured to selectively energize the illumination source 30 with a pair of electrical connections 22, 24, a power source 32 and a light source 34. The power source 32 can be a battery or some other source of power suitable for selectively energizing the light source 34. The light source 34 can be a lamp, bulb, a light emitting diode or some other manmade form of lighting. In the illustrated embodiment of FIG. 3, the power source 32 and light source 34 are combined into a unitary object with, for example, a housing 33 which may be plastic or metal and configured for housing both, maintaining them in electrical connectivity. In one embodiment, the bottom of the housing 33 may include an electrical connective end for electrical communication between the power source 32 and an external electrical connection. In one embodiment, the top of the housing 33 may be transparent or semitransparent to allow for visible emission of the light source 34 through the top of the housing 33 opposite the power source 32.

An embodiment of the illumination circuit 20 is illustrated in FIG. 3 with the first electrical connection 22 being in electrical communication with a second electrical connection 24 for selectively energizing the illumination source 30. The first electrical connection 22 includes an upper contact 22a and a lower contact 22b both being configured for electrical communication. For example, when the upper contact 22a comes into electrical contact with the lower contact 22b, the first electrical connection 22 is operably connected allowing electrical communication to flow between the electrical contacts.

In the depicted embodiment of FIG. 3, a second electrical connection 24 is associated with the centrally located receptacle 17. The second electrical connection 24 is illustrated in association with the inferior plane 17a and is generally in electrical communication with the first electrical connection 22 for switched operation of the illumination circuit 20. In one embodiment, contact with electrical contact 22b by the second electrical connection 24 allows for selective electrical operation of the illumination means 30.

In operation, the illumination source 30 is in electrical communication with the power source 32 upon energizing the first and second electrical connections 22, 24 upon receipt by the centrally located receptacle 17 of the diffusor 26. The embodiment of an electrical circuit 20 includes the first electrical connection 22 in electrical communication with the second electrical connection 24. Upon closing both electrical connections, the illumination source 30 which is depicted with both the light source 34 and power source 32, in energized by the power source 32. In the depicted embodiment, the first electrical connection 22 is associated with the light caddy 13 so that when the light caddy 13 is moved from an open position to a closed position the first electrical connection 22 is completed. In the depicted embodiment, the second electrical connection 24 is associated with the diffusor 26 so that when the diffusor is properly positioned within the centrally located receptacle 17 the second electrical connection 24 is completed.

Figure 7:
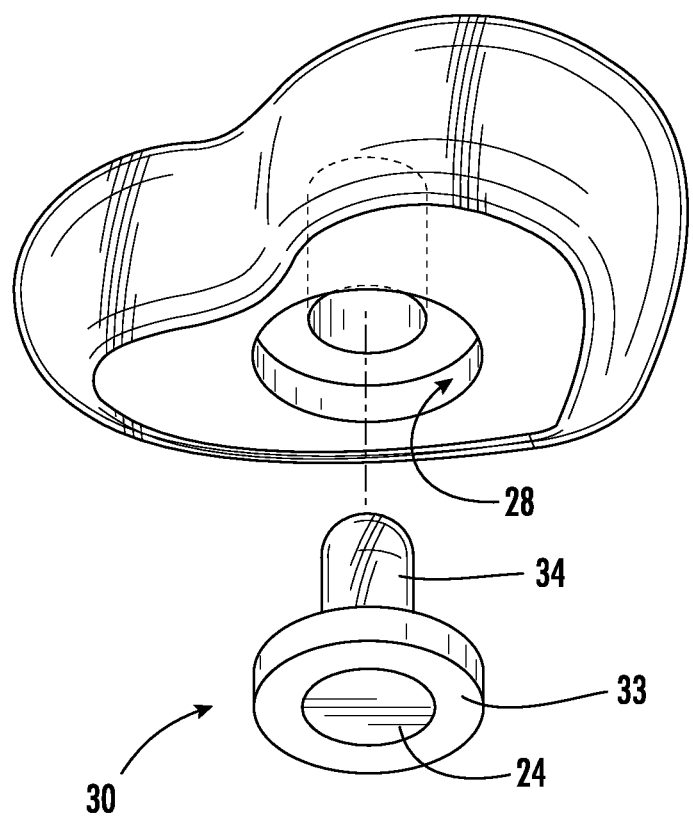
FIG. 7 is a bottom exploded perspective view of the illumination source and diffusor.

The diffusor 26 is configured for accommodation within the 2-piece illuminated exhibit 10. In the depicted embodiment of FIGS. 6-7, the diffusor 26 is generally configured for at least partial accommodation by the centrally located receptacle 17 and the window 15. The depicted embodiment of the diffusor 26 includes a cardioid or epicycloid shaped semitransparent outer surface whose circumference is characterized by a point on the circumference of a pair of equal radius wheels, one rotating along the circumference of the other. In one example, the diffusor 26 is heart-shaped, although other shapes could be utilized without deviating from the scope of the 2-piece illuminated exhibit 10.

The diffusor 26 also includes a central niche 28 which extends from the bottom and corresponds to the contour of the illumination source 30. The niche 28 is generally configured for at least partial receipt of the illumination source 30. In operation, upon receipt by the niche 28 of the illumination source 30, the diffusor 26 is placed within the centrally located receptacle 17 with the outer surface of the diffusor 26 extending at least partially through the window 15. Upon receipt of the diffusor 26 by the centrally located receptacle 17, the first contact switch 22 upon completion of the circuit. An illustrative circuit utilizes the pair of contact switches in communication with the power source 32 and the illumination source 30. Positioning the light caddy 13 into the closed position causes the second contact switch 24 to close, energizing the illumination source 30. Upon emitting illumination by the illumination source 30 the diffusor 26 at least partially receives and deflects the received illumination from the illumination source 30. As the illumination is absorbed and passes outwardly, the diffusor 26 is illuminated. Illumination of the outer concave surface 26a presents an enhanced aesthetic display of the diffusor 26 through the window 15 enhancing the aesthetics of the 2-piece illuminated exhibit 10

It is to be understood that while certain forms of the present invention have been illustrated and described herein, it is not to be limited to the specific forms or arrangement of parts describer herein. Other arrangements or embodiments, changes and modifications not precisely set forth, which can be practiced under the teachings of the present invention are to be understood as being included within the scope of this invention as set forth in the claims below.

What is claimed and desired to be secured by Letters Patent:

1. An illuminated two-piece exhibit comprising:
   a first arcuate arm;
   a second arcuate arm joined to said first arcuate end at a proximate end;
   an intermediary arc extending between said first arcuate arm and said second arcuate arm at a distal end;
   a diffusor configured for receiving a light source;
   a centrally located receptacle extending between said first arcuate arm and said second arcuate arm,
   said centrally located receptacle operable between an open position and a closed position;
   a window presented between said first arcuate arm and said second arcuate are and extending from said centrally located receptacle therethrough; and
   said window configured for receiving said diffusor in said open position wherein said diffusor extends at least partially through said window in said closed position.

2. The illuminated two-piece exhibit of claim 1 further comprising a first electrical connection in electrical communication with a second electrical connection for electrical operation of said light source.

3. The illuminated two-piece exhibit of claim 1 wherein said diffusor includes an outer convex surface which is configured for dispersing illumination received from said light source through said window.

4. The illuminated two-piece exhibit of claim 1 wherein said window is heart-shaped.

5. The illuminated two-piece exhibit of claim 4 wherein said diffusor is heart-shaped.

6. The illuminated two-piece exhibit of claim 1 wherein said diffusor is heart-shaped.

7. The illuminated two-piece exhibit of claim 1 wherein said diffusor includes a niche configured for at least partial receipt of said light source.

8. The illuminated two-piece exhibit of claim 1 wherein said light caddy further comprises at least one hinge for operation of said light caddy between an open position and a closed position.

* * * * *